United States Patent [19]
Richmond

[11] Patent Number: 5,581,458
[45] Date of Patent: Dec. 3, 1996

[54] BUFERED INTELLIGENT DIGITAL TAPE CONTROLLER WITH ONBOARD ECC AND FEATURING GLOBAL CONTROL VARIABLES

[75] Inventor: Robert C. Richmond, Laguna Hills, Calif.

[73] Assignee: Conner Peripherals, Inc., San Jose, Calif.

[21] Appl. No.: 441,604

[22] Filed: May 15, 1995

Related U.S. Application Data

[63] Continuation of Ser. No. 560,608, Jul. 31, 1990, abandoned.

[51] Int. Cl.⁶ .................................................. G06F 17/30
[52] U.S. Cl. .......................... 364/141; 395/250; 395/835; 395/842; 395/849; 395/873
[58] Field of Search .................................... 395/250, 835, 395/842, 849, 873; 360/70, 71, 72.1, 72.2, 72.3, 73.05, 73.06, 74.4; 364/141

[56] References Cited

U.S. PATENT DOCUMENTS

| | | | |
|---|---|---|---|
| 4,080,650 | 3/1978 | Beckett | 364/200 |
| 4,333,143 | 6/1982 | Calder | 395/275 |
| 4,527,237 | 7/1985 | Frieder et al. | 395/200 |
| 4,689,767 | 8/1987 | Stevenson et al. | 395/250 |
| 4,837,641 | 9/1987 | Mori | 360/32 |
| 4,888,691 | 12/1989 | George et al. | 395/700 |
| 4,891,784 | 1/1990 | Kato et al. | 395/250 |
| 5,056,010 | 5/1992 | Huang | 395/425 |
| 5,093,750 | 3/1992 | Park et al. | 360/19.1 |
| 5,210,851 | 5/1993 | Kato et al. | 395/425 |

*Primary Examiner*—Thomas G. Black
*Assistant Examiner*—Paul R. Lintz
*Attorney, Agent, or Firm*—Fliesler, Dubb Meyer & Lovejoy

[57] ABSTRACT

A buffered computer data storage tape controller having a microprocessor, a buffer memory, a host interface, an error correction circuit, and a tape drive interface. A host interface control program executed by the microprocessor controls the host interface for transferring computer data between the buffer memory and a host computer, and for receiving commands from the host computer. An error correction circuit control program executed by the microprocessor controls the error correction circuit for generating parity information for computer data stored in the buffer memory and to be written to tape, and for providing error correction for computer data storage read from tape and stored in the buffer memory for transfer to the host computer. A tape interface control program executed by the microprocessor controls the tape drive interface for transferring computer data between the buffer memory and a tape drive. The control programs are configured to suspend execution at predetermined suspend points and to continue execution at return points associated with said suspend points, and are executed sequentially in a concurrent manner by a scheduler program so that execution of the next control program in sequence continues when an executing program suspends. Interrupt routines executed pursuant to interrupts are provided for accomplishing tasks that have high priority.

6 Claims, 8 Drawing Sheets

HOST ACTIVE/TAPE ACTIVE STATE DIAGRAM

FIG. 4

|   | 7 | 6 | 5 | 4 | 3 | 2 | 1 | 0 |
|---|---|---|---|---|---|---|---|---|
| GROUP 0 | OWNER | | DATA | STATUS | | ERROR | STATUS | |
| GROUP 1 | OWNER | | DATA | STATUS | | ERROR | STATUS | |
| GROUP 2 | OWNER | | DATA | STATUS | | ERROR | STATUS | |

GROUP CONTROL TABLE

FIG. 5

|   | 7 | 6 | 5 | 4 | 3 | 2 | 1 | 0 |
|---|---|---|---|---|---|---|---|---|
| GROUP 0 | BAD TRACK COUNT | | | | | | | |
| 1 | + TRACK CODE | | | | − TRACK CODE | | | |
| 2 | + TRACK CODE | | | | − TRACK CODE | | | |
| ⋮ | | | | | | | | |
| 23 | + TRACK CODE | | | | − TRACK CODE | | | |

BAD TRACK TABLE

BUFFERED INTELLIGENT DIGITAL TAPE CONTROLLER WITH ONBOARD ECC AND FEATURING GLOBAL CONTROL VARIABLES

This application is a continuation of U.S. Pat. No. 07/560,608, filed Jul. 31, 1990, now abandoned.

BACKGROUND OF THE INVENTION

The present invention relates generally to computer data storage such as in computer storage digital audio tape (DAT) drives, and is directed more particularly to a buffered data storage tape controller having reduced hardware and firmware complexity, and which is readily implemented for different environments and different applications, Tape drives are commonly utilized as secondary storage devices for the back up of primary storage devices such as disk drives utilized in large computers such as main frames and in small computers such as personal computers, For small computers, smaller tape drives using quarter-inch tape cartridges (i,e,, the width of the tape is nominally one-quarter inch) are utilized, as well as computer storage digital audio tape (DAT) drives that are based on DAT technology developed for audio programming as defined in the DAT Conference Standard, DIGITAL AUDIO TAPERECORDER, June 1987, published by the Electronic Industries Association of Japan, An example of a format for the storage of computer data utilizing DAT technology is the American National Standards Institute (ANSI) Digital Data Storage (DDS) standard, presently in draft form ("PROPOSED AMERICAN NATIONAL STANDARD HELICAL-SCAN DIGITAL COMPUTER TAPE CARTRIDGE 381 mm (0.150) FOR INFORMATION INTERCHANGE," ASC x3 Project No. 668-D).

The characteristics that have made DAT technology attractive for computer data storage include high capacity, high transfer rate capability, relatively small media size and low media cost, and the adaptability of DAT technology to conform with personal computer storage device form factors including the 5-¼ and 3-½ inch forms.

The use of DAT technology for storage of computer data can be achieved by application of a data storage format, such as the above-referenced ANSI DDS standard, to the DAT Conference audio standard. In particular, the DAT audio standard physical track format is retained, but the contents of the information stored in the tracks is in accordance with the computer data storage format.

Read and write data access from/to a tape storage medium is generally performed with the use of a random access memory (RAM) buffer that can be relatively large to achieve a higher transfer rate. Read and write data access is generally sequential (but not always), and operation with a large RAM buffer can be analogized to a pipeline. A host process operates to fill or empty the pipeline and a tape process operates to empty or fill the pipeline, depending upon the direction of transfer. However, due to factors including the size of the RAMbuffer (the length of the pipeline), the possibility of non-sequential access by the host computer, and the possibility of change in transfer direction, implementation of tape buffering involves many considerations including the following.

As a result of a relatively large buffer, operation of the host process and tape process may be unsynchronized but concurrent. For example, direct memory access (DMA) activity by the host process may occur concurrently with DMA activity by the tape process, but for different blocks of data.

A single buffer is used for different purposes such as host data transfer, tape data transfer, and error checking or correction; and data must be transferred between processes in a controlled manner.

When the host computer changes direction of transfer, the usage of the buffer changes. The buffer must be emptied and the flow direction reversed.

The logical position in the sequential data stream will be different, and typically unpredictable, for the host and tape ends of the pipeline.

Non-sequential access will disrupt flow of data through the pipeline.

As result of the complexity of considerations in implementing tape buffering, known buffered tape controllers tend to be complex, sometimes including the use of multiple dedicated processors for controlling respective processes, with attendant complexity, cost, and lack of flexibility in adaption to different operating environments and/or the more complex data structure of DAT computer data storage.

SUMMARY OF THE INVENTION

It would therefore be an advantage to provide a buffered data tape controller that supports multiple concurrent functions and has reduced hardware and firmware complexity.

Another advantage would be to provide a buffered data tape controller structure that supports multiple concurrent functions and is adaptable to different operating environments.

A further advantage would be to provide a buffered data tape controller structure for computer storage DAT drives.

The foregoing and other advantages are provided by the invention in a buffered computer data storage tape controller that includes a host interface for transferring computer data between a buffer memory and a host computer, and for receiving commands from the host computer; an error correction circuit for generating parity information for computer data stored in the buffer memory and to be written to tape, and for providing error correction for computer data storage read from tape and stored in the buffer memory for transfer to the host computer; and a tape drive interface for transferring computer data between the buffer memory and a tape drive. A host interface control program, an error correction circuit control program, and a tape interface control program are concurrently executed to respectively control the host interface, the error correction circuit and the tape drive interface. The control programs are configured to suspend execution at predetermined suspend points and to continue execution at return points associated with said suspend points, and are executed sequentially so that execution of the next control program in sequence continues when an executing program suspends. Interrupt routines executed pursuant to interrupts are provided for accomplishing tasks that have high priority.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

In the following detailed description and in the several figures of the drawing, like elements are identified with like reference numerals.

Figure 1:
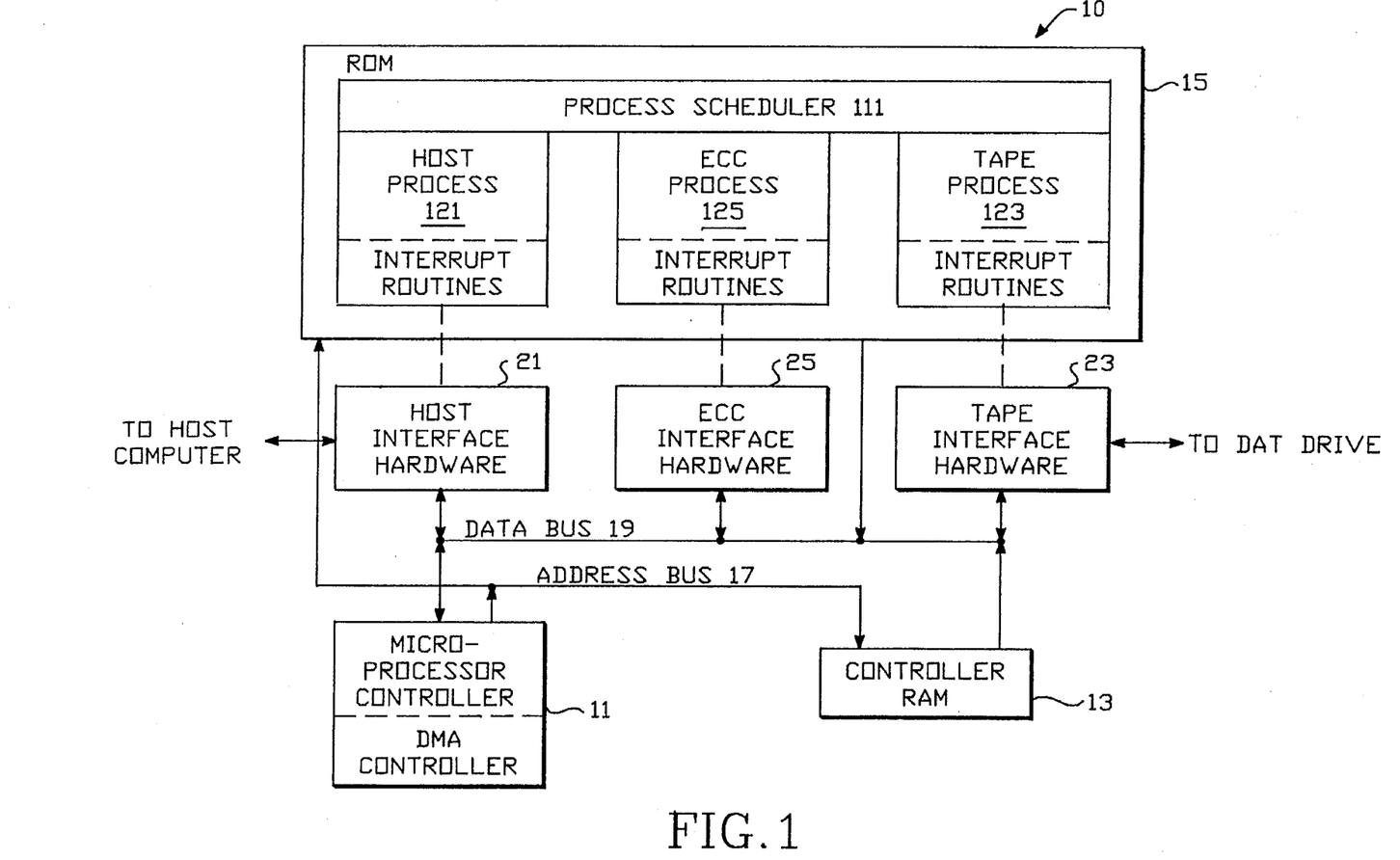
FIG. 1 is a schematic block diagram illustrating a buffered data tape controller in accordance with the invention for use with a computer storage DAT drive.

Referring now to FIG. 1, shown therein is a schematic block diagram of a buffered tape controller 10 in accordance with the invention. The controller 10 is an illustrative implementation for use with a computer storage DAT drive, and includes a microprocessor 11 having an integral direct memory access (DMA) controller, a controller random access memory (RAM) 13, and a read-only memory (ROM) 15. The microprocessor 11 communicates with the controller RAM 13 and the ROM 15 via an address bus 17 and a data bus 19. By way of example, the microprocessor 11 comprises an NEC V50 microprocessor which includes an integral DMA controller. To the extent that implementation is with a microprocessor that does not include an integral DMA control, an appropriate DMA controller would be utilized.

The buffered tape controller further includes host interface hardware 21 that interfaces with the host computer, and tape interface hardware 23 that interfaces with a computer storage DAT drive. Error correction code (ECC) hardware 25 is provided for parity generation of data to be written to tape, and for error checking and correction of data read from tape. The host interface hardware 21, the tape interface hardware 23, and the ECC hardware 25 communicate with the microprocessor 11 and the controller RAM 13 via the data bus 19, and also via interrupt control lines (not shown) and DMA control lines (also not shown).

The functions of the host interface hardware 21 include the transfer of data blocks between the host computer and the controller RAM 13 in a selected direction and under control of the DMA controller, the transfer of commands from the host computer to the microprocessor 11, and the transfer of status information between the microprocessor and the host computer. By way of example, the host interface hardware 21 comprises an integrated circuit in accordance with the ANSI Small Computer System Interface (SCSI) Standard, such as the NCR 53C96.

The ECC hardware 25 calculates the parity information for the data that is to be written to tape, for example by master mode DMA wherein it performs its own address calculations. As to data read from tape, the ECC hardware calculates syndromes, using for example master mode DMA, and further corrects errors in the data read from tape, also using master mode DMA.

The tape interface hardware 23 converts parallel data from the controller RAM 13 to serial data for storage on tape, and converts serial data read from tape to parallel data for storage in the controller RAM. Further, the tape interface hardware 23 provides access to the DAT subcode information, and also provides a communication interface to the DAT drive for tape motion control. Examples of functions provided by the tape interface hardware 23 are set forth in commonly assigned U.S. application Ser. No. 07/436,570, filed Nov. 13, 1989, for "DAT Data Group Assembly," and commonly assigned U.S. application Ser. No. 07/465,726, filed Jan. 17, 1990, for "DAT Drive/Controller Interface" which are incorporated herein by reference.

The ROM 15 more particularly includes respective program processes that are executed by the microprocessor 11 for controlling the functions of the hardware components. In particular, a host process 121 controls the host interface hardware 21, a tape process 123 controls the tape interface hardware 123, and an ECC process 125 controls the ECC hardware 25. As will be discussed in further detail herein, the processes provide different functions which depend on the control mode of operation of the tape controller (e.g., write data, read data, position tape). Moreover, the functions may need to be accomplished in a particular sequence, with different functions being provided by different processes. For example, data to be written to tape needs to be organized in a buffer in the controller RAM 13 (host process), processed for parity generation (ECC process), and then written to tape (tape process). Many of the functions involve DMA transfers which are accomplished by the associated hardware components and do not require involvement of the processes in the actual transfer. Other tasks may involve requesting certain tape drive mechanism actions.

EXECUTION OF THE HOST, ECC, AND TAPE PROCESSES

In order to more efficiently utilize the microprocessor 11, the processes are configured to execute only for limited times so as to avoid tying up the microprocessor while the process being executed is waiting for an event, such as completion of a DMA transfer. In particular, each process has an initial entry point for start-up initialization, one or more suspend points where the process suspends while it waits for an event, and return points that follow the suspend points. A return point is the point at which execution of the process continues at its next activation after it suspends.

Figure 2:
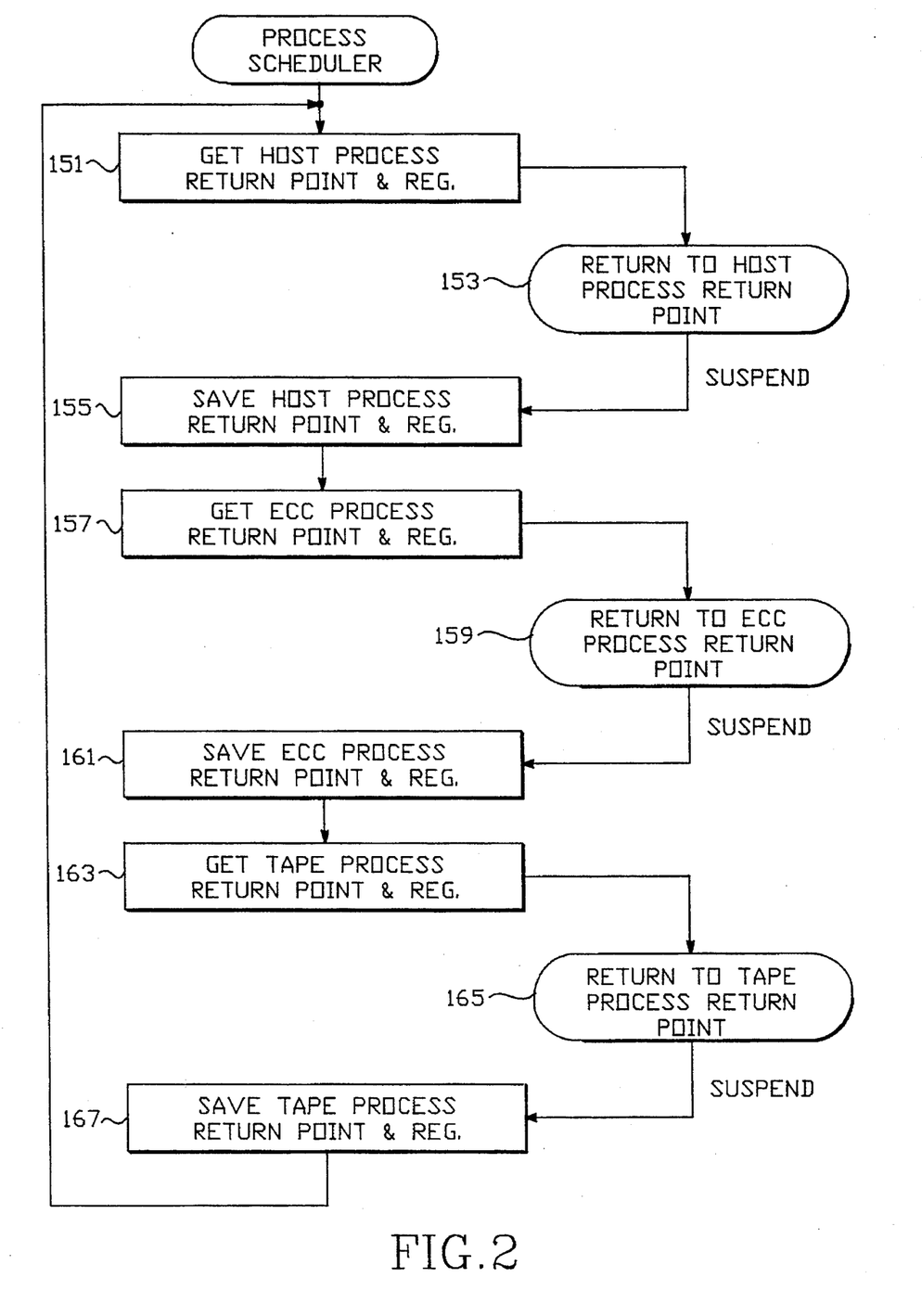
FIG. 2 is a flow diagram of the procedures provided by the process scheduler of the buffered data tape controller of FIG. 1.

FIG. 2 sets forth a flow diagram of the operation of a process scheduler 111 for sequentially activating the processes after the appropriate initialization. When activated, a process executes until it reaches a suspend point, at which time control returns to the process scheduler which saves the return point and register values of the just suspended process (155, 161, 167). Execution of the next process in sequence then continues at the return point associated with the suspend point at which the process had last suspended (153, 159, 165). Suspend points are advantageously located at points where a process has to wait for an event (e.g., completion of a task assigned to associated hardware, such as direct memory access (DMA) transfer of data or completion of ECC parity generation which is achieved with master mode DMA).

Essentially, the process scheduler provides to each process in sequence a processor access opportunity or processing window at which time the active process has access to the microprocessor 11. The active process continues with its processing until a suspend point is reached, at which time the process returns control of the microprocessor 11 to the process scheduler 111. Each process is configured to limit its use of the microprocessor by function and can utilize the microprocessor time not being used by the other processes. In contrast to fixed time-slice process scheduling, for example, the sequenced access/suspend configuration is self-adapting to the dynamic requirements of each process. The sequencing processing by the process scheduler does not utilize significant microprocessor time.

As characterized herein, a process is considered "active" when it is being executed pursuant to activation by the process scheduler 11, and is considered "participating" when involved in achieving a particular control mode such as writing data to tape.

Each process includes interrupt routines that are executed pursuant to interrupts generated by associated hardware components of the buffered tape controller 10. When an interrupt is generated, the active process is stopped so that the interrupt routine associated with the particular interrupt can be executed. At any given time the activated interrupt routine can be associated with a process different from the process that was interrupted, and can also perform functions that affect the later execution of the associated process, such as setting a flag that will be checked by the associated process when it is subsequently activated by the process scheduler 111. The hardware interrupts are selectively enabled by the processes as required for the control mode of operation of the tape controller.

After execution of an interrupt routine, the interrupted active process continues at the point of interruption. Depending upon implementation considerations, interrupts are utilized for processing that requires real time response, including, for example, the transfer of a data frame or data track from the DAT drive to the controller RAM 13 by DMA.

From the foregoing, it should be appreciated that each of the host, tape, and ECC processes includes (a) high priority functions that are performed pursuant to hardware interrupts, and (b) lower priority functions that are performed by the access/suspend procedure sequenced by the process scheduler 111.

COORDINATION OF THE HOST, ECC, AND TAPE PROCESSES

The host, ECC, and tape processes communicate with each other via global variables stored in shared memory locations in the controller RAM 13. The global variables are defined to control the flow of computer storage data into and out of a buffer area in the controller RAM 13, reverse the flow of data, or to stop the flow of data. Non-data transfer operations are also controlled using the global variables, which are defined such that a concise but sufficient set of shared information is provided to achieve coordination of the processes.

Inter-process communications basically involve (a) communications for overall control as determined by commands from the host computer, and (b) communications for management and processing of the data in the buffer area of the controller RAM 13.

The global variables, which are defined further herein, include the following.

CONTROL
POSITION TARGET
START GROUP
ATTENTION
GROUP BUFFERS
ECC BUFFERS
GROUP CONTROL TABLE
BAD TRACK TABLES

OVERVIEW OF THE GLOBAL VARIABLES

Generally, CONTROL is utilized to specify the control mode of operation of the controller (e.g., write data, read data, position tape), and to synchronize the overall operation of the processes.

POSITION TARGET is set by the host process to identify the target tape location for any tape positioning control mode specified in CONTROL.

START GROUP can be set by the host process in the read or write mode of operation to inform the tape process of the data group at which to start reading or writing. For a DAT drive implementation, a data group is a group in accordance with the ANSI DDS Standard, and for other implementations a data group is a predetermined organizational grouping of data such as blocks.

ATTENTION is set by the tape process to report asynchronous events from the tape process to the host process.

GROUP BUFFERS contain respective data groups transferred from the host computer and to be written to tape, or data groups read from tape and to be transferred to the host computer.

ECC BUFFERS contain the ECC parity data for the data groups in GROUP BUFFERS. For a DAT drive implementation, the ECC parity data is generated in accordance with C3 ECC processing as specified by the ANSI DDS Standard.

The GROUP CONTROL TABLE (GCT) contains information for controlling the processing of the data groups in GROUP BUFFERS by the processes.

The BAD TRACK TABLES contain error information as to tracks read from tape for each of the data groups buffered in GROUP BUFFERS.

PARTICULARS AS TO THE GLOBAL VARIABLES

Figure 3:
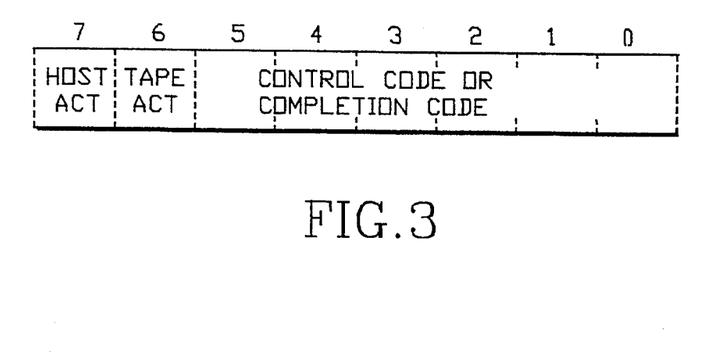
FIG. 3 is a schematic diagram illustrating the organization of a CONTROL variable of the buffered data tape controller of FIG. 1 utilized for coordinating program processes thereof.

More particularly as to CONTROL, set forth in FIG. 3 is an illustrative example of the organization of an 8-bit byte that can be utilized to store the CONTROL global variable. Bit 7 is designated as a HOST ACTIVE bit which can be set or cleared (i.e., set to zero) only by the host process, while bit 6 is designated as a TAPE ACTIVE bit which can be set or cleared only by the tape process. As discussed further herein, the HOST ACTIVE and TAPE ACTIVE bits operate in a handshaking sequence to keep the processes in overall synchronization.

Bits 5 through 0 contain either a control code or a completion code. A control code is specified by the host process in response to a host command to indicate the mode of operation for the controller, and a completion code is specified by the tape process upon termination of the mode of operation specified by current control mode.

The HOST ACTIVE bit is normally set by the host process in response to a host command to indicate a HOST ACTIVE state and to indicate that the processes should be performing the functions appropriate for the control mode of operation specified by the control code in bits <5:0>. The HOST ACTIVE bit is normally cleared by the host process when the current control mode of operation has terminated to cause the other processes to go to idle.

When the HOST ACTIVE bit is set by the host process as to a new control code specified by bits <5:0> of CONTROL, the tape process acknowledges the new control code by setting the TAPE ACTIVE bit to one. Only the host process can initiate a control mode-of operation by specifying a control code, and the HOST ACTIVE bit and the TAPE ACTIVE bit must both be zero before the host process can switch to a new control code.

Either the host process or the tape process can terminate the mode of operation specified by the current control code. The host process terminates the current mode of operation by clearing the HOST ACTIVE bit. In response, the tape process completes the operation specified by the current control code, and then clears the TAPE ACTIVE bit and enters a completion code in bits <5:0> of CONTROL. All processes then go idle. The tape process terminates the current mode of operation at any time by clearing the TAPE ACTIVE bit and entering a completion code in bits <5:0> of CONTROL to inform the host process of the reason for termination. In response, the host process clears the HOST ACTIVE bit, and all processes then go idle.

Figure 4:
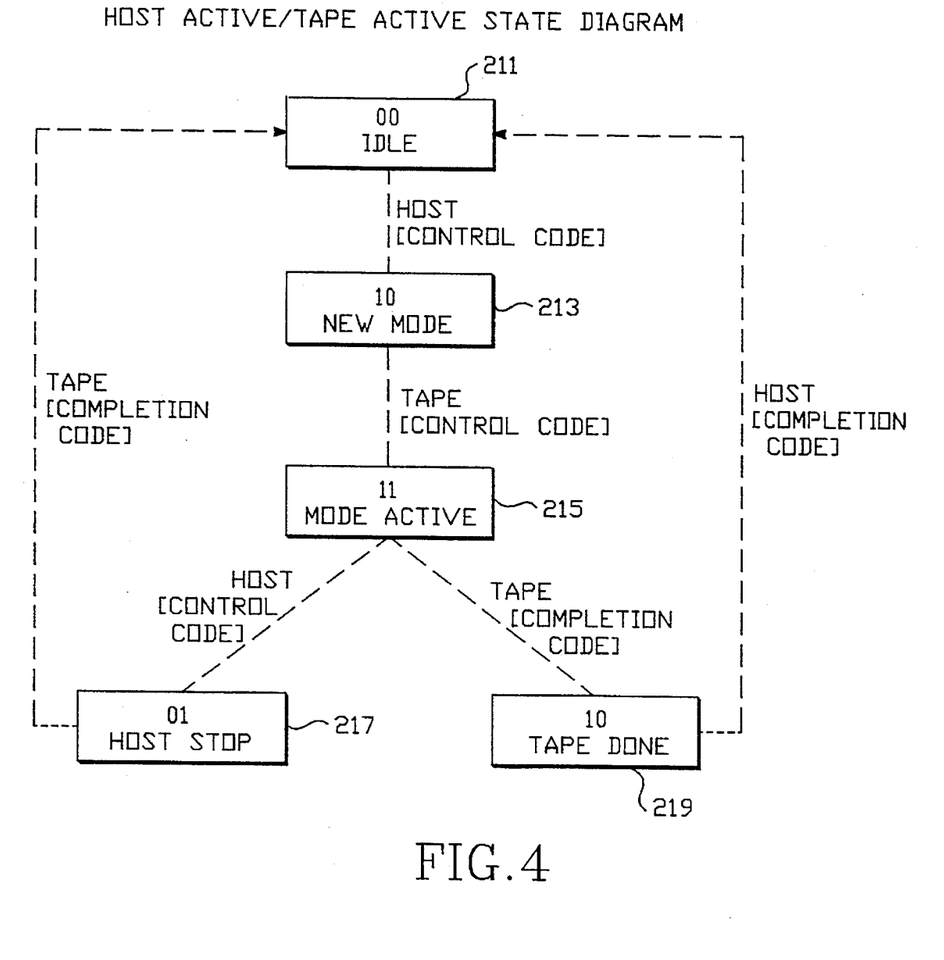
FIG. 4 is a state diagram depicting the handshake between the host process and the tape process of the buffered data tape controller of FIG. 1 as accomplished with the CONTROL variable.

Referring to FIG. 4, set forth therein is a state diagram of the handshake between the host process and the tape process as realized by the HOST ACTIVE and TAPE ACTIVE bits of CONTROL. For each state transition, FIG. 4 indicates the values of the HOST ACTIVE and TAPE ACTIVE bits, respectively, the process that caused a state change, and the use of bits <5:0> of CONTROL (i.e., control code or completion code) in brackets. It should be appreciated that the handshake procedures are carried out by the host and tape processes while executing pursuant to the sequential access/suspend scheduling described above. At 211, the HOST ACTIVE bit and the TAPE ACTIVE bit are both zero in the idle state. Pursuant to a command from the host computer, the host process sets the HOST ACTIVE bit and enters into bits <5:0> the control code appropriate for the host command, which produces the state at 213. The tape process, which is continually checking the HOST ACTIVE bit, sets the TAPE ACTIVE bit to acknowledge that the HOST ACTIVE bit has been set, which produces the mode active state at 215. During the mode active state at 215, the control mode of operation specified by the control code in bits <5:0> of CONTROL is being performed.

If the host process terminates the current control mode of operation, it clears the HOST ACTIVE bit, which produces the host stop state at 217. At the transition to 217, bits <5:0> of CONTROL continue to contain the control code. In response to the HOST ACTIVE bit being cleared to transition to 217, the tape process clears the TAPE ACTIVE bit and enters a completion code in bits <5:0> of CONTROL, which produces the idle state at 211.

If the tape process terminates the current control mode of operation as specified by the control code, it clears the TAPE ACTIVE bit and enters a completion code in bits <5:0> of CONTROL, and the handshake state transitions to the tape stop state at 219. In response to the TAPE ACTIVE bit being cleared at 219, the host process clears the HOST ACTIVE bit, which produces the idle state at 211.

Table 1 below sets forth examples of control codes that can be set by the host process, and also identifies the processes that participate in accomplishing the control mode of operation specified by the control code.

TABLE 1

| BITS <5:0> | CONTROL CODE | PARTICIPATING PROCESSES |
|---|---|---|
| 01 | write tape | HOST, ECC, TAPE |
| 02 | read tape | HOST, ECC, TAPE |
| 08 | position to record N | HOST, ECC, TAPE |
| 09 | position to file N | HOST, ECC, TAPE |
| 0A | position to save set N | HOST, ECC, TAPE |
| 0B | position to EOD | HOST, ECC, TAPE |
| 0C | rewind | HOST, TAPE |
| 0D | erase tape, long | HOST, TAPE |
| 0E | erase tape, short | HOST, TAPE |
| 0F | retention tape | HOST, TAPE |
| 11 | load cassette | HOST, TAPE |
| 12 | eject cassette | HOST, TAPE |
| 13 | execute diagnostics | HOST, ECC, TAPE |
| 14 | prevent media removal | HOST, TAPE |
| 15 | allow media removal | HOST, TAPE |
| 16 | test unit ready | HOST, TAPE |
| 1F | initialize | HOST, TAPE |

Table 2 below sets forth examples of completion codes that can be set by the tape process in bits <5:0> of CONTROL.

TABLE 2

| BITS <5:0> | COMPLETION CODE |
|---|---|
| 20 | normal completion, no drive error |
| 21 | EOD encountered |
| 23 | BOT encountered |
| 24 | position lost |
| 25 | internal error |
| 26 | volume overflow |
| 27 | write protected |
| 28 | blank tape |
| 29 | no cassette |
| 2A | write failure |
| 2B | cassette loading error |
| 2C | cassette unloading error |
| 2D | capstan error |
| 2E | cylinder error |
| 2F | reel error |
| 30 | mechanism error |
| 31 | tape cut |
| 32 | tape jam |
| 33 | threshold adjust error |

Bit 5 is always 1 for a completion code, and is always 0 for a control code. This insures that the host process will detect that the tape process has completed. If CONTROL contains a control code that specifies a tape positioning operation to a target tape location N (record N, file N, or save set N as indicated in Table 1 above), the target address is placed in POSITION TARGET by the host process. This causes the tape process to fill the next available GROUP BUFFER with the data group containing the target record, file, or save set. After completing the transfer of the target data group to a GROUP BUFFER, the tape process enters a completion code in bits <5:0> of CONTROL. By way of example, for DAT computer data storage in accordance with the ANSI DDS Standard, the group information table and the subcode information can be utilized to find the data group that contains the target record, file, or save set. The START GROUP global variable is utilized in conjunction with read or write control modes of operation only, and allows the host process to inform the tape process where to start reading or writing. This allows the writing to begin at a location other than with the next group in sequence, which would otherwise be the normal procedure. For example, START GROUP allows a read-modify-write procedure wherein writing begins with re-writing a partially filled end group (i.e., the group immediately prior to the end of data (EOD) mark) so that it will be completely filled. As another example, the use of START GROUP allows an overwrite append wherein the tape process is reading ahead of the location where writing is to begin.

During a tape writing operation, ATTENTION is set by the tape process to indicate an End-Of-Tape (EOT) as an early warning to inform the tape process of the approaching end of tape, so that the host computer can be alerted of the need to complete the current tape cartridge to avoid volume overflow. The use of a separate variable ATTENTION for indicating EOT provides for prompt notification of an approaching EOT, before the next group completes.

When ATTENTION is set by the tape process to indicate EOT, the host process should not begin a new group until the just-received group has been written to the tape. This will minimize possible data loss in the event that EOT is encountered.

ATTENTION is also used to indicate that the cassette has been ejected, so that any cache operations may immediately be terminated.

Only the tape process specifies ATTENTION, and the host process must clear the code after it has been detected. Table 3 below sets forth examples of information that can be communicated by ATTENTION codes.

TABLE 3

| BITS <7:0> | ATTENTION CODE |
|---|---|
| 0 | no attention condition |
| 1 | EOT (early warning) |
| 2 | cassette ejected |

When a control code in CONTROL specifies reading data from tape or writing data to tape, each process processes data which has been organized into data groups in accordance the above referenced ANSI DDS Standard. Pursuant to that standard, a data group is a contiguous set of 22 data frames as recorded on tape. Each data group fits into a pair of physical 64 Kilobyte memory segments which comprise a GROUP BUFFER. As set forth in greater detail in the ANSI DDS Standard, each group contains an index that identifies the structure within the data group, which may contain data, file marks, save set marks, or padding data.

Each data group of 22 frames has an associated ECC data frame stored in an ECC BUFFER. By way of illustrative example, the ECC BUFFERS for the ECC data frames can begin with the physical memory segment that follows the last segment utilized by GROUP BUFFERS.

The GROUP CONTROL TABLE is provided to identify the operational status of each data group in GROUP BUFFERS. When the control code of CONTROL specifies read or write relative to tape, each process must locate via the GROUP CONTROL TABLE an appropriate GROUP BUFFER to process. When a process is completed with processing the data of a GROUP BUFFER, the GROUP CONTROL TABLE is updated by such process to indicate its completion.

Figure 5:
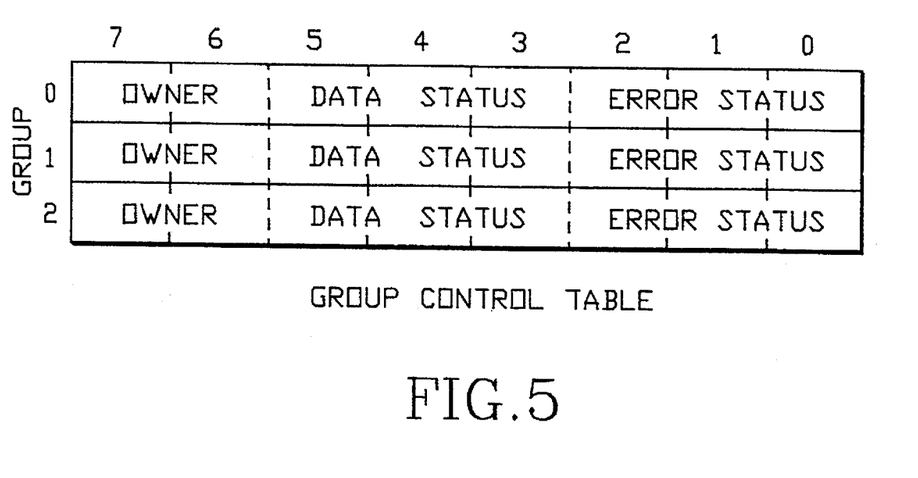
FIG. 5 is a schematic depiction of the GROUP CONTROL TABLE of the buffered data tape controller of FIG. 1 utilized to coordinate processing of buffered data.

Referring particularly to FIG. 5, for the illustrative example of three (3) GROUP BUFFERS, the GROUP CONTROL TABLE includes for each GROUP BUFFER an OWNER field, a DATA STATUS field, and an ERROR STATUS field.

The OWNER field identifies which process currently has ownership of the group. If the DATA STATUS field is non-zero, then the OWNER field identifies the process that last utilized the GROUP BUFFER. The OWNER field can be utilized to provide the following information.

TABLE 4

| BITS <7:6> | OWNER |
|---|---|
| 0 | no owner assigned |
| 1 | host process |
| 2 | ECC process |
| 3 | tape process |

The DATA STATUS field is set by a process when a group is available for use by another process, and can only be changed by the process whose turn it is to access the associated GROUP BUFFER. In particular, when the OWNER of a data group completes processing the group, it sets the DATA STATUS field to indicate that the data group is ready for the next process in turn relative to the processing as specified by the current control code in the CONTROL global variable.

The particular sequence of process operation on data in a GROUP BUFFER will depend on whether data is being written to tape or read from tape. For writing data to tape, the sequence of processing is: host process, ECC process, and tape process. For reading data from tape, the sequence of processing is reversed: tape process, ECC process, and then host process. It should be appreciated that the processing by a process of a given GROUP BUFFER may involve more than one activation of the process by the process scheduler, particularly where the processing involves waiting for the completion of hardware tasks.

Generally, the GROUP BUFFERS are utilized sequentially in round-robin fashion, and each process goes to the next group in sequence when such group is ready for that particular process. Thus, depending upon the direction of data transfer to or from the tape, the next process after completion of processing by given process is implied. It is noted that the sequence of microprocessor access opportunities or processing windows provided by the process scheduler 111 remains the same and is not affected by the particular sequence of processing operations on the buffered group data.

Table 5 below sets forth examples of information communicated via the DATA STATUS field.

TABLE 5

| GCT <5:3> | DATA STATUS |
|---|---|
| 0 | Data not valid |
| 1 | Host done, ready for ECC gen |
| 2 | Host done, ECC done, ready to write tape |
| 3 | Host done, ECC done, tape done, data written to tape |

TABLE 5-continued

| GCT <5:3> | DATA STATUS |
|---|---|
| 4 | Tape done reading, ready for ECC check |
| 5 | Tape done, ECC done, ready for host |
| 6 | Tape done, ECC done, host done reading tape |

When a process sets the DATA STATUS field, it also sets the ERROR STATUS field to indicate the result from the actions of the process. When a process begins to access a group, the ERROR STATUS is used to determine the next action to perform. Table 6 below sets forth examples of information provided in the ERROR STATUS field and identifies the process that can provide such ERROR STATUS information.

TABLE 6

| GCT <2:0> | ERROR STATUS | SET BY |
|---|---|---|
| 00 | no error | any |
| 01 | tracks in error | TAPE |
| 02 | data corrected | ECC |
| 03 | uncorrectable | ECC, TAPE |
| 04 | abort | ECC |
| 05 | bad format-abort | HOST |
| 06 | data not read-abort | TAPE |

The ECC process uses the abort code to indicate that it has gone idle as a result of the HOST ACTIVE bit and the TAPE ACTIVE bit having been cleared. Otherwise, status resulting from process termination is reported as a completion code in bits <5:0> of CONTROL, not ERROR STATUS.

Figure 6:
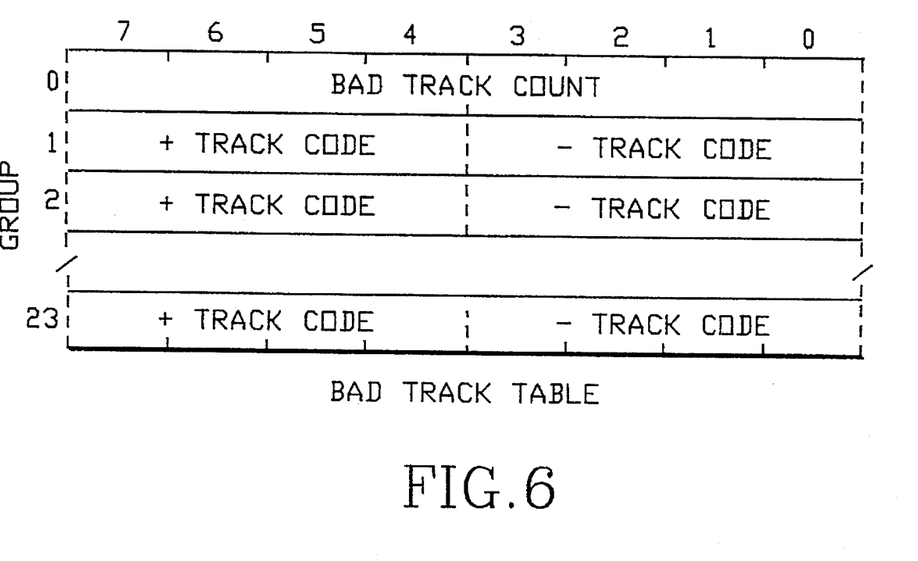
FIG. 6 is a schematic depiction of the BAD TRACK TABLE of the buffered data tape controller of FIG. 1 utilized for error correction code (ECC) processing of data read from tape.

For data read from tape, a BAD TRACK TABLE (BTT) structure is provided for each of the GROUP BUFFERS for the storage information as to the error status of each track in the data group stored in the GROUP BUFFER. FIG. 6 schematically depicts an illustrative example of a BAD TRACK TABLE, which includes a track error status entry for each of the tracks of the group and a bad track count entry. The bad track count entry provides the count of tracks that have errors, and the track status entries can provide the following information as reported by the tape process.

TABLE 7

| TRACK CODE <3:0> | TRACK STATUS |
|---|---|
| 0 | good track |
| 1 | frame subcode LFID not found, no DMA occurred |
| 2 | track IPF error |
| 3 | track check sum error |
| 4 | frame header miscompare |
| 5 | frame subcode LFID/header miscompare |

In the above Table, IPF refers to an interpolation flag which indicates the presence of an error that could not be corrected by C1 and C2 ECC processing. LFID refers to the logical frame identifier in accordance with the ANSI DDS Standard that identifies the logical frame number within the associated data group. The BTT can be used by the tape process to detect that a complete group has been read from tape, and is utilized by the ECC process for error correction and to detect uncorrectable errors.

OPERATION OF THE PROCESSES

Figure 7:
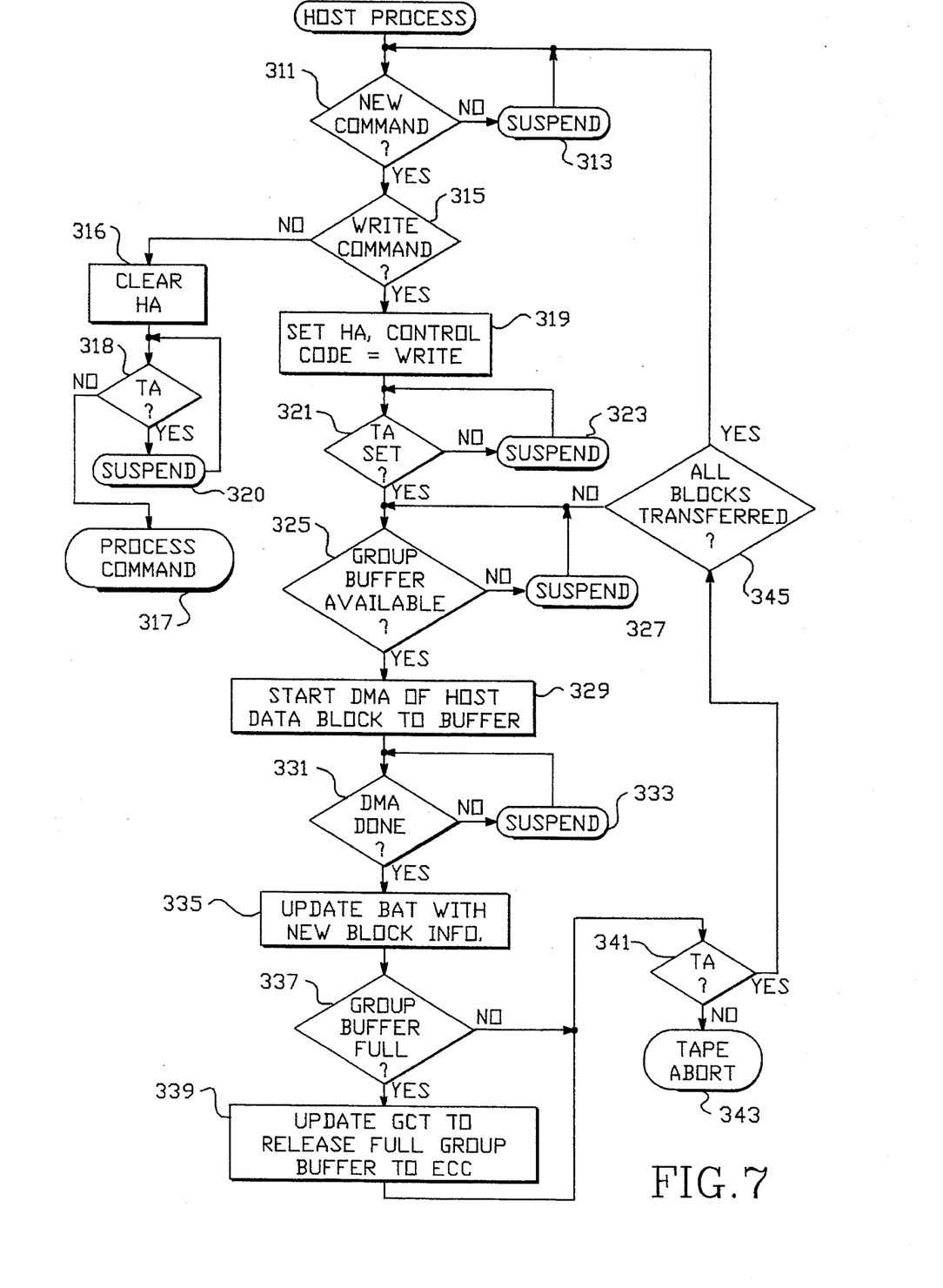
FIG. 7 is a flow diagram illustrating a procedural sequence that can be utilized by the host process of the buffered data tape controller of FIG. 1 for the control mode of writing data to tape.

Referring now to FIG. 7, set forth therein by way of illustrative example is a flow diagram illustrating a procedural sequence that can be utilized by the host process for the control code of writing data to tape. For completeness, the flow diagram of FIG. 7 includes steps executed while the host process is idle and waiting for a new command from the host. At 311 a determination is made as to whether the host computer has provided a new command to the host process. If no, the host process suspends at 313, and then repeats the determination at 311 at its next scheduled access to the microprocessor 11.

If the determination at 311 is yes, a new command has been provided by the host computer to the host process, a determination is made at 315 as to whether the new command is a write command. If no, at 316 the HOST ACTIVE bit is cleared, although it may have already been cleared, and then at 318 a determination is made as to whether the TAPE ACTIVE bit is set. If yes, the host process suspends at 320, and then repeats the determination at 318 at its next scheduled access to the microprocessor 11.

If the determination at 318 is no, the TAPE ACTIVE bit is not set, the new command is processed at 317, which would include identification of the new command and executing the appropriate procedures in accordance therewith.

As will be evident from the remaining procedures in the write process, the foregoing procedures of clearing the HOST ACTIVE bit and checking the TAPE ACTIVE bit is to allow the processing of a series of write commands from the host computer without having to stop the tape.

If the determination at 315 is yes, the new command is the write command, then at 319 the host process sets the HOST ACTIVE bit of the CONTROL global variable and further sets bits <5:0> of CONTROL to indicate the write tape control code.

At 321 the host process checks if the TAPE ACTIVE bit of CONTROL is set. If no, the host process suspends at 323, and then repeats the determination at 321 at its next scheduled access to the microprocessor 11.

If the determination at 321 is yes, the TAPE ACTIVE bit is set, a determination is made at 325 as to whether a group buffer is available. If no, the host process suspends at 327, and then repeats the determination at 325 at its next scheduled access to the microprocessor 11.

If the determination at 325 is yes, a GROUP BUFFER is available, the host process requests the host interface hardware 21 to begin the DMA transfer of a host data block (for example, as defined by the ANSI SCSI Standard) to the available GROUP BUFFER. At 331, a check is made as to whether the requested DMA transfer has been completed. If no, the host process suspends at 333, and then repeats the check at 331 at its next scheduled access to the microprocessor 11.

If the determination at 331 is yes, the requested DMA transfer has been completed, at 335 the host process updates the block allocation table (BAT) of the group being assembled in a GROUP BUFFER with the new data block information. The BAT would be in accordance with the ANSI DDS Standard. At 337, a determination is made as to whether the GROUP BUFFER is full. If yes, the GROUP CONTROL TABLE is updated at 339 to release control of the filled GROUP BUFFER to the ECC process.

If the determination at 337 is no, the GROUP BUFFER is not yet full, or after the GROUP CONTROL TABLE is updated at 339, a determination is made at 341 as to whether the TAPE ACTIVE bit of CONTROL remains set. If no, a tape abort is performed at 343. Pursuant to the tape abort, the host process would read the completion code information written to CONTROL by the tape process, and report the error to the host computer.

If the determination at 341 is yes, the TAPE ACTIVE bit remains set, a determination is made at 345 as to whether all requested data blocks have been transferred for the current host command. If no, processing continues at 325 for the determination of whether a GROUP BUFFER is available. If the determination at 345 is yes, all data blocks have been transferred, the host process becomes idle and waits for a new command at 311. As discussed above relative to procedures at 316, 318, the HOST ACTIVE bit will be cleared pursuant to receiving a new host command that is not a write command.

Figure 8:
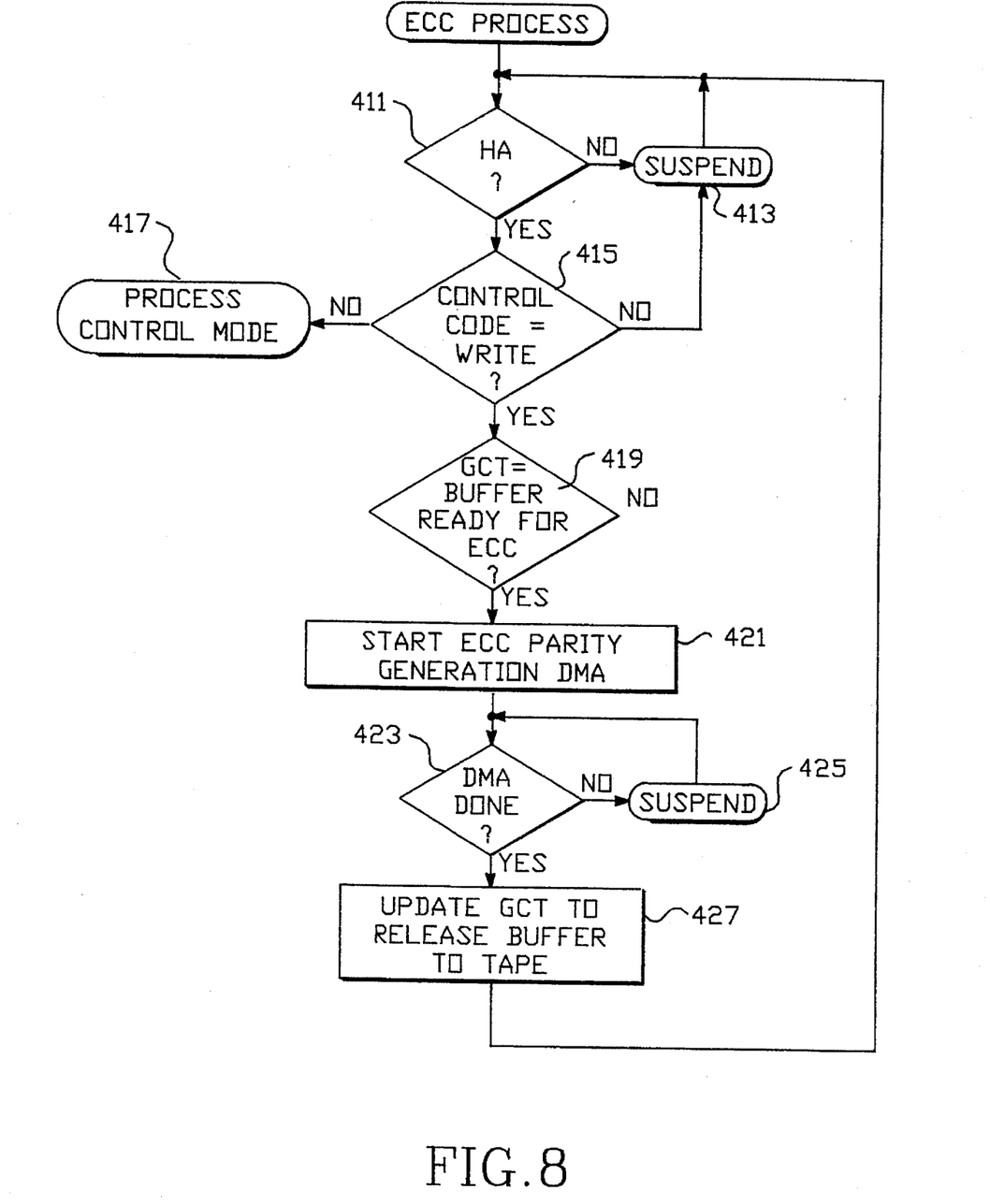
FIG. 8 is a flow diagram illustrating a procedural sequence that can be utilized by the ECC process of the buffered data tape controller of FIG. 1 for the control mode of writing data to tape.

Referring now to FIG. 8, set forth therein by way of illustrative example is a flow diagram illustrating a procedural sequence that can be utilized by the ECC process for the control code of writing data to tape. For completeness, the flow diagram of FIG. 8 includes steps executed while the ECC process is checking the HOST ACTIVE bit and the control code information in CONTROL to determine the functions it will be providing. At 411 a determination is made as to whether the HOST ACTIVE bit has been set by the host process. If no, the ECC process suspends at 413, and repeats the determination at 411 at its next scheduled access to the microprocessor 11.

If the determination at 411 is yes, the HOST ACTIVE bit is set, a determination is made at 415 as to whether the control code information in CONTROL specifies the write mode of operation. If no, processing branches to 417 for further processing in accordance with the particular control code.

If the determination at 415 is yes, the control code information in CONTROL is the write control code, a determination is made at 419 as to whether the GROUP CONTROL TABLE indicates that a GROUP BUFFER is ready for ECC processing (i.e., whether the host process has updated the GROUP CONTROL TABLE to indicate that the ECC process may become the owner). If no, the ECC process suspends at 413, and continues with the determination at 411 at its next scheduled access to the microprocessor 11.

If the determination at 419 is yes, the GROUP CONTROL TABLE indicates that a GROUP BUFFER is ready for ECC processing, at 421 the ECC process directs the ECC hardware to generate and store the ECC parity words for the ready GROUP BUFFER pursuant to DMA. Since ECC parity generation will not necessarily be performed with sequential addresses, parity generation by the ECC hardware is accomplished with master mode operation of the DMA controller of the microprocessor 11 wherein the ECC hardware performs its own address calculations.

At 423 a determination is made as to whether the ECC parity generation by the ECC hardware is complete. If no, the ECC process suspends at 425, and repeats the determination at 423 at its next scheduled access to the microprocessor 11.

If the determination at 427 is yes, the ECC parity generation for the GROUP BUFFER is complete, the GROUP CONTROL TABLE is updated, for example pursuant to an interrupt routine, to release the GROUP BUFFER just processed to the tape process. The reasons for using an interrupt to update the GROUP CONTROL TABLE is to provide for faster response in view of the need to provide a sufficient flow of data to the tape process to avoid stopping the tape. Control returns to the determination at 411 as to whether the HOST ACTIVE bit is set.

Figure 9:
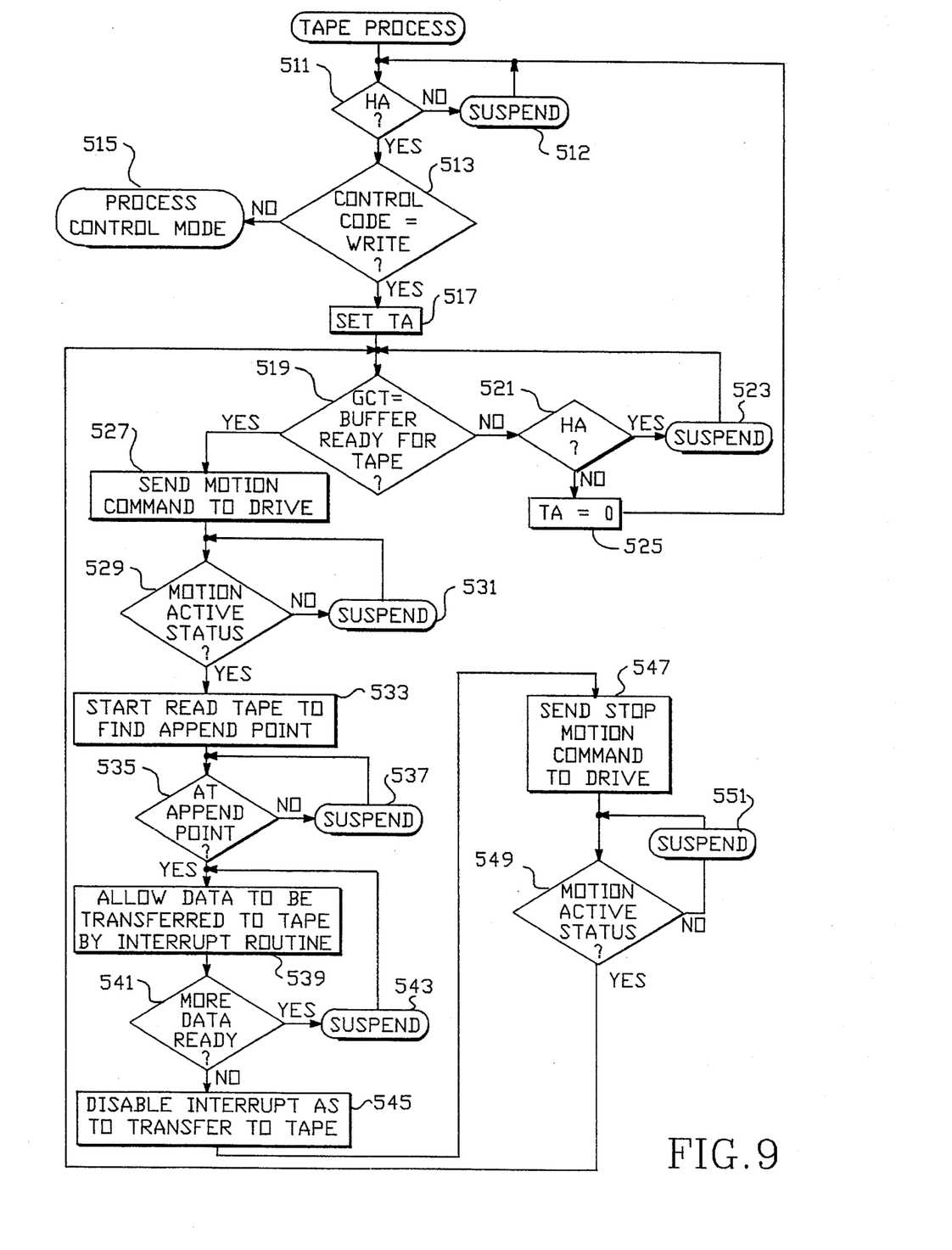
FIG. 9 is a flow diagram illustrating a procedural sequence that can be utilized by the tape process of the buffered data tape controller of FIG. 1 for the control mode of writing data to tape.

Referring now to FIG. 9, set forth therein by way of illustrative example is a flow diagram illustrating a procedural sequence that can be utilized by the tape process for the control code of writing data to tape. For completeness, the flow diagram of FIG. 9 includes steps executed while the tape process is checking the HOST ACTIVE bit and the control code in CONTROL to determine the functions it will be providing. At 511 a determination is made as to whether the HOST ACTIVE bit is set. If no, the tape process suspends at 512, and repeats the determination at 511 at its next scheduled access to the microprocessor 11.

If the determination at 511 is yes, the HOST ACTIVE bit is set, a determination is made at 513 as to whether the control code information in CONTROL is for the write mode of operation. If no, further processing relative to the control code information continues at 515. Such further processing would include identifying the control code information in CONTROL, and determining whether the tape process would be involved.

If the determination at 513 is yes, the control code information is for the write mode of operation, at 517 the tape process sets the TAPE ACTIVE bit in CONTROL. A determination is then made at 519 as to whether the GROUP CONTROL TABLE indicates that a GROUP BUFFER is ready for the tape process (i.e., the ECC process has updated the GROUP CONTROL TABLE to indicate that ECC parity generation for a GROUP BUFFER has been completed). If no, a determination is made at 521 as to whether the HOST ACTIVE bit is set. If yes, the host process suspends at 523 and then continues at the determination of 519 at its next scheduled access to the microprocessor 11.

If the determination at 521 is no, the HOST ACTIVE bit is not set, the tape process clears the TAPE ACTIVE bit at 525, and processing continues with the determination at 511.

If the determination at 519 is yes, the GROUP CONTROL TABLE indicates that a group is ready for the tape process, at 521 a play tape command to the tape drive. At 529 the tape process checks whether the tape status indicates that the requested tape motion is active. If no, the tape process suspends at 531, and then repeats the determination at 529 at its next scheduled access to the microprocessor 11.

If the determination at 529 is yes, the requested tape motion is active, at 533 the tape is read to find the append point. In particular, the tape process reads the subcode information on tape pursuant to interrupts to find the append point, without transferring data to the controller RAM. At 535 the tape process checks if the tape is at the append point. If no, the tape process suspends at 537, and then repeats the determination at 535 at its next scheduled access to the microprocessor 11.

If the determination at 535 is yes, the tape is at the append point, at 539 the tape process enables the transfer of data to tape pursuant to interrupts provided by the tape interface hardware. Such interrupts are generated, for example, pursuant to the rotation of the tape head in the DAT drive, as disclosed in the above identified application Ser. No. 07/465,726. Pursuant to the interrupt routine, data in a GROUP BUFFER is transferred via DMA to the tape drive one frame at a time (i.e., one frame pursuant to each interrupt), and the GROUP CONTROL TABLE is updated at the completion of the transfer of a GROUP BUFFER. At 541 a determination is made as to whether data is ready to be written to tape, for example in a GROUP BUFFER being written to tape. If yes, the tape process suspends at 543 and continues at the determination at 541 at its next scheduled access to the microprocessor 11. It should be appreciated that while GROUP BUFFER data is being sent to the tape drive, the only execution of the tape process is checking whether further data is ready for transfer and then suspending if further data is ready. Thus, other processes will have access to the microprocessor 11 while data is being transferred to tape. The data to tape transfer routine is interrupt driven and thus is not dependent on whether the tape process is being executed (i.e., active), and the transfer is accomplished with DMA.

When the determination at 541 is no, no further data is ready to be transferred to tape, transfer to tape by interrupt is disabled at 545, and the stop tape motion command is sent to the DAT drive at 547. At 549 a determination is made as to the DAT drive status indicates that the tape motion has stopped. If yes, control transfers to the determination at 519 as to whether the GROUP CONTROL TABLE indicates that a GROUP BUFFER is ready for transfer to tape. If the determination at 549 is no, the tape motion has not stopped, the process suspends at 549 and then continues the determination at 549 at its next scheduled access to the microprocessor 11.

Pursuant to the suspend/access procedures of the process scheduler, the above described procedures of the host process, the ECC process, and the tape process operate concurrently as well as adaptively to meet the processing requirements of the different processes.

The processing of other control codes should be should be readily appreciated by persons skilled in the art from the foregoing, and with the understanding that the host process responds to the host computer command and informs the other processes of the tasks to be completed via the global variables, and that tasks are performed on an access/suspend or interrupt basis, depending upon response time required.

For the particular example of reading data from tape, the host process sets the control code in CONTROL to specify the read mode of operation and sets the host active bit. The tape process detects the active state of the HOST ACTIVE bit, sets the TAPE ACTIVE bit, and starts transferring data to the GROUP BUFFERS via an interrupt routine that utilizes DMA transfers. The ECC process provides error detection and correction on the data transferred to the GROUP BUFFERS, and the host process transfers data from the GROUP BUFFERS and/or error status information to the host computer.

As a further example, an erase tape mode of operation can be implemented as a modified version of the write to tape mode. Groups are written as in the write mode of operation, but there are no ECC calculation, write append, or rewrite. The host process provides "dummy" data groups to control the length of the erase operation.

IBM/PC COMPTIBLE EMBODIMENT

Figure 10:
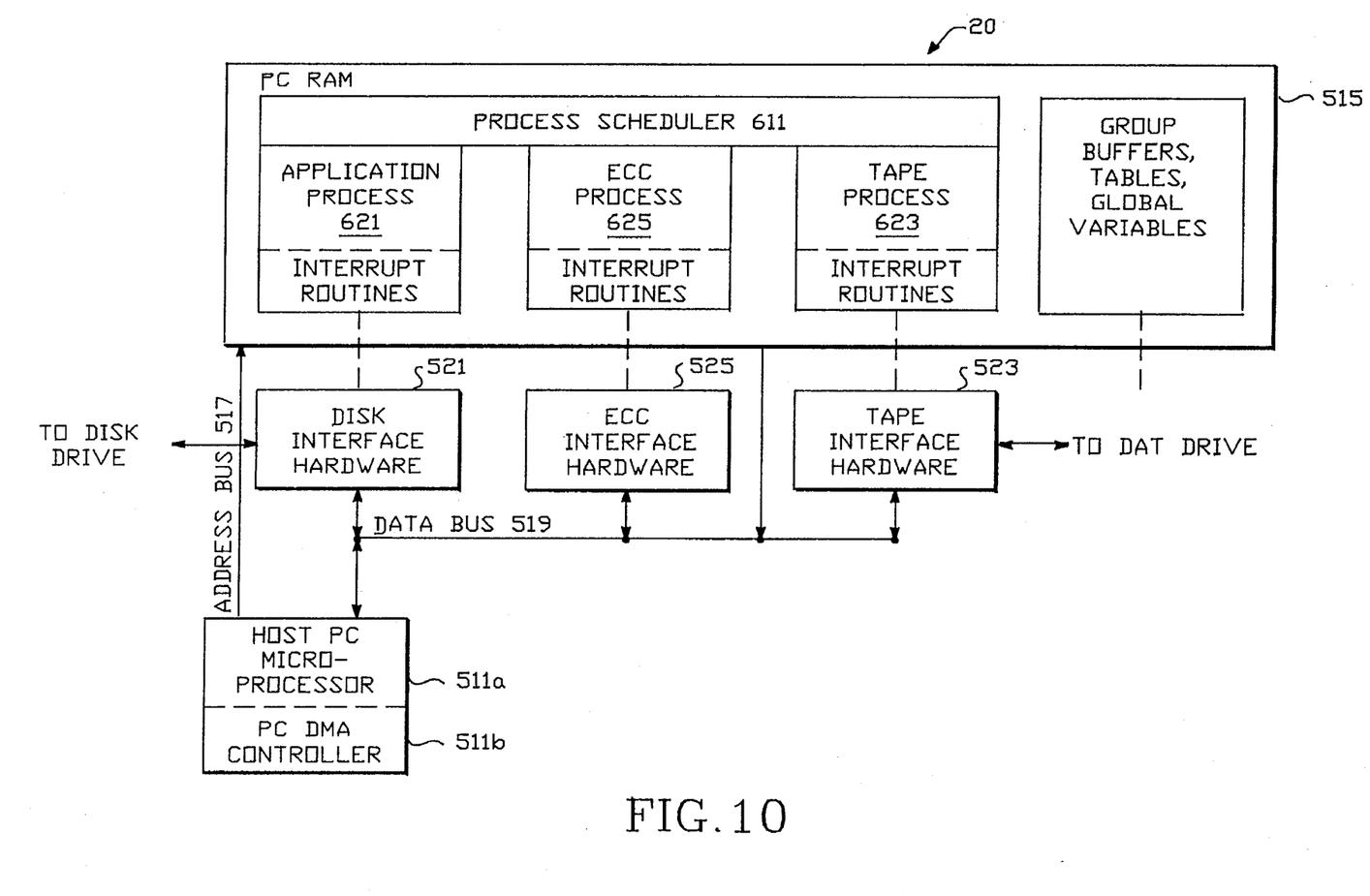
FIG. 10 is a schematic block diagram illustrating a further embodiment of the buffered data tape controller of the invention for use with a PC compatible host computer.

Referring now to FIG. 10, set forth therein is a block diagram of an embodiment of the buffered tape controller of the invention for use with IBM/PC type host computers. The tape controller 20 includes tape interface hardware 523 and ECC interface hardware 525 substantially similar to the corresponding components in the controller 10 of FIG. 1. The tape interface hardware 523 and the ECC hardware 525 would be conveniently located on a plug-in peripheral board installed in one of the expansion slots of the host PC. The controller 20 further includes a process scheduler 611, an ECC process 625 and a tape process 623 that are substantially similar to the corresponding components in the controller 10 of FIG. 1, except that they are located in the host PC RAM 515.

An application program 621 stored in the host PC RAM 515 replaces the host process 121, and a peripheral interface hardware component such as disk interface hardware 521 replaces the host interface hardware 121 of the controller of FIG. 1. The microprocessor 511a and the DMA controller 511b of the host PC replace the microprocessor 11 of the controller of FIG. 1, and the random access memory 515 of the host PC replaces the controller RAM 13 of the controller 10 of FIG. 1 for storage of the global variables including GROUP BUFFERS and TABLES. The host PC data bus 519 replaces the data bus 19, and the host PC address bus replaces 517 the address bus 17.

It should be appreciated that in a PC implementation, the application, ECC, and tape processes are operating in an appropriate host computer operating environment such as DOS or UNIX, and the application process is configured to access the disk interface hardware by calls to operating environment subroutines, such as BIOS subroutines, which would transfer data between the storage disk and the GROUP BUFFERS in RAM by interrupt and DMA procedures. The application process is also appropriately configured to interface with the keyboard and the video display of the host PC, for example by calls to operating environment subroutines.

Essentially, in the controller of FIG. 10, the application process communicates with the disk drive interface and the user, just as the host process communicates with the host computer in the controller of FIG. 10. The ECC processing and the tape processing are substantially the same as in the controller 10 of FIG. 1.

IMPLEMENTATION FOR FIXED HEAD TAPES DRIVES

While the foregoing has been generally directed to the particular implementation of a computer storage DAT drive, it should be appreciated that the buffered tape controller of the invention can be implemented for use with fixed (i.e., non-rotating) head tape drive technology, such as quarter-inch tape drives. Considerations with such implementations would include different structures as to the data being transferred to and from the tape drive, different tape interface hardware, and different ECC hardware, if any is utilized.

The foregoing has been a disclosure of a buffered data tape controller that advantageously separates host, error correction, and tape processes into independent processes that are efficiently coordinated through the use of several well defined global variables. Each process includes procedures allowing efficient microprocessor sharing, high priority, real time processing as required, and adaptation by the processes to the processing requirements of the different processes wherein a process that requires more microprocessor processing receives more processing time. As a result of the efficient coordination of independent processes and efficient use of the microprocessor, the concurrent operation of the different processes is easily coordinated for the different operations required of a buffered tape controller including transfer of buffered data from one process to another, change in transfer direction, and non-sequential access. The structure of software into independent processes that adapt to processing requirements allows the efficient use of a single microprocessor, which provides for uncomplicated implementation in a PC environment. The use of independent processes further allows for independent development and testing of the processes prior to integration into the overall architecture, flexibility, and the straightforward adaptation to different operating environments and applications.

Although the foregoing has been a description and illustration of specific embodiments of the invention, various modifications and changes thereto can be made by persons skilled in the art without departing from the scope and spirit of the invention as defined by the following claims.

What is claimed is:

1. A system for controlling a tape drive, comprising:

a microprocessor;

a random access memory including a buffer memory having global variables stored therein, said buffer memory having data stored therein organized into predetermined groups of identified lengths, each group comprising predetermined organizational grouping of data;

host interface circuitry in communication with said buffer memory for transferring data between said buffer memory and a host and adapted for receiving commands from a host;

tape drive interface circuitry adapted to transfer data between said buffer memory and a tape drive;

error correction circuitry operative to generate parity information for data to be written to tape, and to provide error correction for data read from tape;

a host interface control program executable by said microprocessor for controlling said host interface circuitry, said host interface control program configured to suspend execution thereof at predetermined suspend points and to continue execution at return points associated with said suspend points of said host interface control program;

an error correction control program executable by said microprocessor for controlling said error correction circuitry, said error correction program configured to suspend execution thereof at predetermined points and to continue execution at return points associated with said suspend points of said error correction control program;

a tape drive interface control program executable by said microprocessor for controlling said tape drive interface circuitry, said tape drive interface control program configured to suspend execution thereof at predetermined suspend points and to continue execution at return points associated with said suspend points of said tape drive interface control program;

a sequencing program executable by said microprocessor for scheduling the execution of said host interface, error correction and tape drive interface control programs, wherein execution of the next control program in sequence continues when a currently executing control program suspends; and interrupt routines executed by said microprocessor pursuant to interrupt requests from said host interface circuitry, said error correction circuitry, and said tape drive interface control circuitry for accompanying tasks that have high priority;

wherein said global variables include information indicative of which program is processing a particular group.

2. The system of claim 1 wherein said interrupt routines include routines for providing direct memory access (DMA) transfer of data between the host computer and the buffer memory, and DMA transfer of data between the buffer memory and the tape drive.

3. A buffered controller for controlling the transfer of data between a tape drive and a host, comprising:

a microprocessor;

a random access memory in communication with said microprocessor and including a buffer memory having global variables stored therein, said buffer memory having data stored therein organized into predetermined groups of identified length, each group comprising predetermined organizational grouping of data;

host interface means in communication with said buffer memory for transferring computer data between said buffer memory and a host and adapted for receiving commands from a host;

error correction means for generating parity information for data stored in said buffer memory and to be written to tape, and for providing error correction for data read from tape and stored in said buffer memory for transfer to a host;

tape drive interface means for transferring data between said buffer memory and a tape drive;

a host interface control program executable by said microprocessor for controlling said host interface means, said host interface control program configured to suspend execution thereof at predetermined suspend points and to continue execution at return points associated with said suspend points of said host interface control program;

an error correction control program executable by said microprocessor for controlling said error correction means, said error correction control program configured to suspend execution thereof at predetermined suspend points and to continue execution at return points associated with said suspend points of said error correction control program;

a tape drive interface control program executable by said microprocessor for controlling said tape drive interface control means, said tape drive interface control program configured to suspend execution thereof at predetermined suspend points and to continue execution at return points associated with said suspend points of said tape drive interface control program;

a sequencing program executable by said microprocessor for scheduling the sequential execution of all of said control programs, whereby execution of the next control program in sequence continues when an executing control program suspends; and interrupt routines executed by said microprocessor pursuant to interrupt requests from said host interface means, said error correction means, and said tape interface means for accomplishing tasks that have high priority;

wherein said global variables include information indicative of which program is processing a particular group.

4. The buffered controller of claim 3, wherein said interrupt routines provide direct memory access (DMA) transfer of data between the host computer and the buffer memory, and DMA transfer of data between the buffer memory and the tape drive.

5. A buffered computer data storage tape controller for use with a host computer having a host microprocessor, a host random access memory, and an interface for a peripheral storage device for transferring data between a buffer area in the host memory and a peripheral storage device, the controller comprising:

error correction means for generating parity information for computer data stored in the buffer area and to be written to tape, and for providing error correction for computer data storage read from tape and stored in the buffer area;

tape drive interface means for transferring computer data between the buffer area and a tape drive;

said host random access memory having global variables stored therein and including information for coordinating the concurrent operation of said control programs;

a host control program executable by the host computer microprocessor for controlling the transfer of data between the peripheral interface and buffer memory area in the host memory, said host control program configured to suspend execution thereof at predetermined suspend points and to continue execution at return points associated with said suspend points;

an error correction control program executable by the host computer microprocessor for controlling said error correction means, said error correction control program configured to suspend execution thereof at predetermined suspend points and to continue execution at return points associated with said suspend points;

a tape drive interface control program executable by the host computer microprocessor for controlling said tape drive interface means, said tape drive interface control program configured to suspend execution thereof at predetermined suspend points and to continue execution at return points associated with said suspend points;

a sequencing program executable by the host computer microprocessor for scheduling the sequential execution of said control programs, whereby execution of the next control program in sequence continues when an executing control program suspends; and interrupt routines executed pursuant to interrupts from said error correction means and said tape interface means for accomplishing tasks that have high priority;

wherein the data stored in the buffer area is organized into predetermined identical groups, each group comprising a predetermined organizational grouping of data, and wherein said global variables include information indicative of which control program is controlling the processing of a particular group.

6. The buffered computer data storage controller of claim 5, wherein said interrupt routines include routines for providing direct memory access (DMA) transfer of data between the buffer memory and the tape drive.

* * * * *